United States Patent
Yang (10) Patent No.: US 12,089,101 B2
(45) Date of Patent: Sep. 10, 2024

(54) CELL HANDOVER METHOD AND APPARATUS, HANDOVER CONFIGURATION METHOD AND APPARATUS, AND USER EQUIPMENT

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 387 days.

(21) Appl. No.: 17/609,769

(22) PCT Filed: May 8, 2019

(86) PCT No.: PCT/CN2019/086041
§ 371 (c)(1),
(2) Date: Nov. 8, 2021

(87) PCT Pub. No.: WO2020/223931
PCT Pub. Date: Nov. 12, 2020

(65) Prior Publication Data
US 2022/0225192 A1 Jul. 14, 2022

(51) Int. Cl.
*H04W 36/08* (2009.01)
*H04W 36/00* (2009.01)

(52) U.S. Cl.
CPC . *H04W 36/00837* (2018.08); *H04W 36/0061* (2013.01); *H04W 36/0066* (2013.01); *H04W 36/08* (2013.01)

(58) Field of Classification Search
CPC ....... H04W 36/00837; H04W 36/0061; H04W 36/0066; H04W 36/08
See application file for complete search history.

(56) References Cited

U.S. PATENT DOCUMENTS

| 8,731,554 B2 * | 5/2014 | Yoshihara | H04W 36/30 455/435.2 |
| 2014/0024376 A1 * | 1/2014 | Suga | H04W 36/30 455/436 |

(Continued)

FOREIGN PATENT DOCUMENTS

| CN | 103313320 A | 9/2013 |
| CN | 104105137 A | 10/2014 |

(Continued)

OTHER PUBLICATIONS

International Search Report of PCT Application No. PCT/CN2019/086041 dated Jan. 23, 2020 with English translation, (4p).

(Continued)

*Primary Examiner* — Dai Phuong
(74) *Attorney, Agent, or Firm* — Arch & Lake LLP (57) ABSTRACT

A cell handover method comprises receiving handover configuration information sent by a base station, the handover configuration information comprising handover target cells configured for a UE and a first handover condition and a second handover condition configured for each handover target cell, in which the handover difficulty of the first handover condition is lower than the handover difficulty of the second handover condition; obtaining service types supported by each handover target cell; and selecting a handover condition used for each handover target cell according to the service types supported by each handover target cell and services required by the UE.

14 Claims, 5 Drawing Sheets

(56) References Cited

U.S. PATENT DOCUMENTS

| | | | |
|---|---|---|---|
| 2014/0126545 A1* | 5/2014 | Tamura | H04W 36/0069 |
| | | | 370/332 |
| 2015/0282013 A1* | 10/2015 | Kim | H04W 36/14 |
| | | | 370/331 |
| 2015/0341834 A1 | 11/2015 | Lee et al. | |
| 2016/0100341 A1 | 4/2016 | Wu et al. | |
| 2018/0279186 A1 | 9/2018 | Park et al. | |
| 2019/0174391 A1* | 6/2019 | Ode | H04W 88/08 |
| 2021/0360495 A1* | 11/2021 | Lovlekar | H04W 36/305 |
| 2022/0007246 A1* | 1/2022 | de Silva | H04W 48/20 |
| 2022/0078683 A1* | 3/2022 | Eklof | H04W 36/00838 |

FOREIGN PATENT DOCUMENTS

| | | |
|---|---|---|
| CN | 104488318 A | 4/2015 |
| CN | 104717703 A | 6/2015 |
| CN | 104869600 A | 8/2015 |
| CN | 105099608 A | 11/2015 |
| CN | 107046700 A | 8/2017 |
| CN | 107113673 A | 8/2017 |
| CN | 108260177 A | 7/2018 |
| CN | 109392030 A | 2/2019 |

OTHER PUBLICATIONS

Lenovo, Motorola Mobility, LTE conditional handover, 3GPP TSG-RAN WG2 Meeting #106, R2-1906237, May 1, 2019, (3p).

Vivo, Handover command for conditional handover, 3GPP TSG-RAN WG2 Meeting #106, R2-1905970, May 1, 2019, (2p).

* cited by examiner

CELL HANDOVER METHOD AND APPARATUS, HANDOVER CONFIGURATION METHOD AND APPARATUS, AND USER EQUIPMENT

CROSS REFERENCE TO RELATED APPLICATION

The present application is a U.S. National Phase of International Patent Application Serial No. PCT/CN2019/086041 filed on May 8, 2019 the entire contents of which are incorporated herein by reference for all purposes.

TECHNICAL FIELD

The present disclosure relates to the technical field of communication, in particular to a cell handover method and apparatus, a handover configuration method and apparatus, user equipment, a base station, and a computer-readable storage medium.

BACKGROUND

In a handover process of a 4th generation mobile communication technology (4G), a network sends a handover request to a handover target cell according to a measurement report result of user equipment (UE), and after the handover target cell performs confirmation, a handover command is sent to the UE, and the handover command carries configuration information of one handover target cell. After receiving the handover command, the UE initiates a random access procedure to the handover target cell.

In order to improve the robustness of handover, a 5th generation mobile communication technology (5G) proposes conditional handover (CHO), that is, the network can configure the handover target cell and a handover triggering condition for the UE in advance. When the handover triggering condition is met, the UE initiates the handover process by itself, and the network does not need to send the handover command again. Before handover is triggered, the network can change the handover target cell and the handover triggering condition.

At present, CHO selects and configures the handover target cell and handover conditions only according to signal quality, but services provided by different cells may be different, such as Multimedia Broadcast Multicast Service (MBMS), direct link (sidelink) and other private network services. If the handover target cell and the handover condition are selected only according to the signal quality, it may cause service interruption.

SUMMARY

According to a first aspect of the present disclosure, a cell handover method is provided. The method is applied to user equipment (UE) and includes:
  receiving handover configuration information sent by a base station, the handover configuration information including handover target cells configured for the UE and a first handover condition and a second handover condition configured for each handover target cell, and handover difficulty of the first handover condition being lower than handover difficulty of the second handover condition;
  obtaining service types supported by each handover target cell; and
  selecting a handover condition for each handover target cell according to the service types supported by each handover target cell and services required by the UE.

According to a second aspect of the present disclosure, a handover configuration method is provided. The method is applied to a base station and includes:
  generating handover configuration information for user equipment (UE), the handover configuration information including handover target cells configured for the UE and a first handover condition and a second handover condition configured for each handover target cell, and handover difficulty of the first handover condition being lower than handover difficulty of the second handover condition; and
  sending the handover configuration information to the UE.

According to a third aspect of the present disclosure, user equipment (UE) is provided, and includes:
  at least one processor; and
  a memory configured to store executable instructions of the at least one processor; and
  the at least one processor is configured to:
  receive handover configuration information sent by a base station, the handover configuration information including handover target cells configured for the UE and a first handover condition and a second handover condition configured for each handover target cell, and handover difficulty of the first handover condition being lower than handover difficulty of the second handover condition;
  obtain service types supported by each handover target cell; and
  select a handover condition for each handover target cell according to the service types supported by each handover target cell and services required by the UE.

According to a fourth aspect of the present disclosure, a base station is provided, and includes:
  at least one processor; and
  a memory configured to store executable instructions of the at least one processor; and
  the at least one processor is configured to:
  generate handover configuration information for user equipment (UE), the handover configuration information including handover target cells configured for the UE and a first handover condition and a second handover condition configured for each handover target cell, and handover difficulty of the first handover condition being lower than handover difficulty of the second handover condition; and
  send the handover configuration information to the UE.

According to a fifth aspect of the present disclosure, a non-transitory computer-readable storage medium is provided, which has computer instructions stored thereon, and when the instructions are executed by a processor, steps of the above-mentioned cell handover method are implemented.

According to a sixth aspect of the present disclosure, a non-transitory computer-readable storage medium is provided, which has computer instructions stored thereon, and when the instructions are executed by a processor, steps of the above-mentioned handover configuration method are implemented.

It should be understood that the above general descriptions and the following detailed descriptions are exemplary and explanatory only, and are not intended to limit the present disclosure.

BRIEF DESCRIPTION OF THE DRAWINGS

The accompanying drawings, which are incorporated in and constitute a part of this specification, illustrate examples consistent with the present disclosure and together with the specification serve to explain the principles of the present disclosure.

DETAILED DESCRIPTION

Examples will be described in detail herein, examples of which are illustrated in the accompanying drawings. When the following description refers to the accompanying drawings, the same numbers in different drawings represent the same or similar elements unless otherwise indicated. The implementations described in the following examples do not represent all implementations consistent with the disclosure. On the contrary, they are merely examples of apparatuses and methods consistent with some aspects of the disclosure as detailed in the appended claims.

Figure 1:
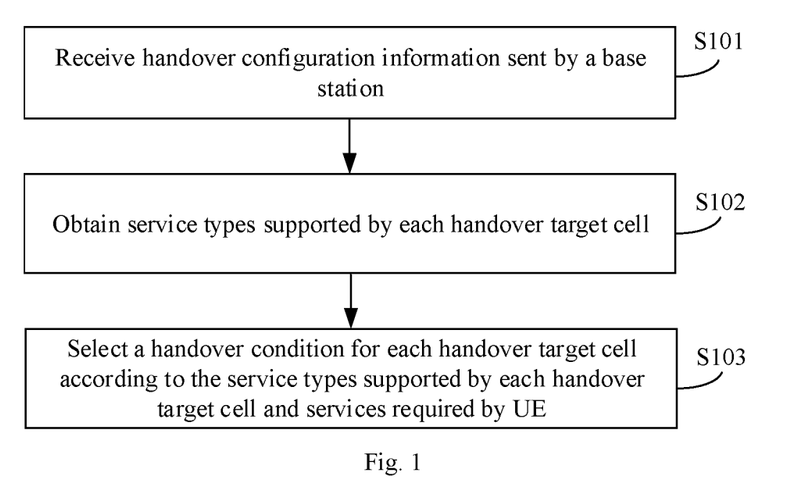
FIG. 1 is a flow chart illustrating a cell handover method according to an example of the present application.

FIG. 1 is a flow chart illustrating a cell handover method according to an example of the present application. The example is described from a UE side. As shown in FIG. 1, the cell handover method includes:

In step S101, handover configuration information sent by a base station is received, the handover configuration information includes handover target cells configured for UE and a first handover condition and a second handover condition configured for each handover target cell, and handover difficulty of the first handover condition is lower than handover difficulty of the second handover condition.

For example, the first handover condition may be: reference signal receiving power (RSRP) of a serving cell is lower than −98 decibels (db), and RSRP of a handover target cell is higher than −98 db; and the second handover condition may be: the RSRP of the serving cell is lower than −101 db, and the RSRP of the handover target cell is higher than −98 db.

In step S102, service types supported by each handover target cell are obtained.

In the example, system information of each handover target cell may be read, and the service types supported by each handover target cell are obtained according to the system information.

In step S103, a handover condition for each handover target cell is selected according to the service types supported by each handover target cell and services required by the UE.

In the example, the handover condition for each handover target cell may be selected by, but not limited to, the following modes:

Mode 11) a matching degree between the service types supported by each handover target cell and the services required by the UE is determined; and the first handover condition is selected for a handover target cell whose matching degree is greater than a preset threshold, and the second handover condition is selected for a handover target cell whose matching degree is less than or equal to the threshold.

The matching degree may be determined according to the quantity of overlaps between the service types supported by each handover target cell and the services required by the UE.

Since the handover difficulty of the first handover condition is lower than the handover difficulty of the second handover condition, in order to make it easy for the UE to switch to the handover target cell with a high matching degree, the first handover condition is selected for the handover target cell with the high matching degree, and in order to make it difficult for the UE to switch to the handover target cell with a low matching degree (that is, try to keep it in current cell), the second handover condition is selected for the handover target cell with the low matching degree.

The above-mentioned preset threshold may be flexibly set as required.

Mode 12) a service with the highest priority is determined from the services required by the UE, the first handover condition is selected for a handover target cell that supports the service with the highest priority, and the second handover condition is selected for a handover target cell that does not support the service with the highest priority.

The service with the highest priority may be, but is not limited to, a service most needed by the UE.

Since the handover difficulty of the first handover condition is lower than the handover difficulty of the second handover condition, in order to make it easy for the UE to switch to the handover target cell that supports the service with the highest priority, the first handover condition is selected for the handover target cell that supports the service with the highest priority, and in order to make it difficult for the UE to switch to the handover target cell that does not support the service with the highest priority (that is, try to keep it in current cell), the second handover condition is selected for the handover target cell that does not support the service with the highest priority.

Application Example I

For example, the UE is currently transmitting MBB, MBMS, and sidelink services.

The handover target cells configured by the base station for the UE and the first handover condition and the second handover condition configured for each handover target cell are:

a) for a cell 1, the first handover condition is: the RSRP of the serving cell is lower than −98 db, and RSRP of the cell 1 is higher than −98 db; and the second handover condition is: the RSRP of the serving cell is lower than −101 db, and the RSRP of the cell 1 is higher than −98 db.

b) for a cell 2, the first handover condition is: the RSRP of the cell 2 is 3 db higher than that of the serving cell; and the second handover condition is: the RSRP of the cell 2 is 6 db higher than that of the serving cell.

c) for a cell 3, the first handover condition is: the RSRP of the serving cell is lower than −98 db, and RSRP of the cell 3 is higher than −98 db; and the second handover condition is: the RSRP of the serving cell is lower than −101 db, and the RSRP of the cell 3 is higher than −98 db.

In the example, the UE obtains the service types supported by the three target cells by reading the system information of the three handover target cells and the service types are:
   a) the cell 1 supports MBB and sidelink.
   b) the cell 2 supports MBB and MBMS.
   c) the cell 3 supports MBB, sidelink and MBMS.

The handover conditions selected by the UE for the different handover target cells according to the quantity of overlaps between the service types supported by the handover target cells and the services required by the UE are:
   a) the second handover condition is adopted for the cell 1.
   b) the second handover condition is adopted for the cell 2.
   c) the first handover condition is adopted for the cell 3.

Application Example II

For example, the UE is currently transmitting MBB, MBMS, and sidelink services.

The handover target cells configured by the base station for the UE and the first handover condition and the second handover condition configured for each handover target cell are:
   a) for a cell 1, the first handover condition is: the RSRP of the serving cell is lower than −98 db, and RSRP of the cell 1 is higher than −98 db; and the second handover condition is: the RSRP of the serving cell is lower than −101 db, and the RSRP of the cell 1 is higher than −98 db.
   b) for a cell 2, the first handover condition is: the RSRP of the cell 2 is 3 db higher than that of the serving cell; and the second handover condition is: the RSRP of the cell 2 is 6 db higher than that of the serving cell.

In the example, the UE obtains the service types supported by the two target cells by reading system information of the two handover target cells and the service types are:
   a) the cell 1 supports MBB and sidelink.
   b) the cell 2 supports MBB and MBMS.

The handover conditions selected by the UE for the different handover target cells according to whether the handover target cells provide sidelink are:
   a) the first handover condition is adopted for the cell 1.
   b) the second handover condition is adopted for the cell 2.

According to the above-mentioned examples, by obtaining the service types supported by each handover target cell and selecting the handover condition for each handover target cell according to the service types supported by each handover target cell and the services required by the UE, during the handover based on multiple conditions, the impact of services is considered while ensuring signal quality, and service interruption is avoided.

Figure 2:
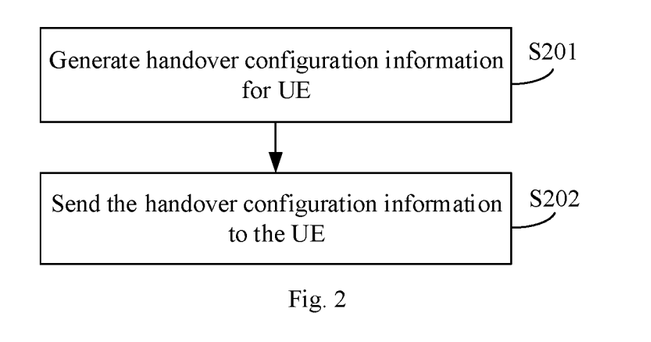
FIG. 2 is a flow chart illustrating a handover configuration method according to an example of the present application.

FIG. 2 is a flow chart illustrating a handover configuration method according to an example of the present application. The example is described from a base station side. As shown in FIG. 2, the handover configuration method includes:

In step S201, handover configuration information is generated for UE, the handover configuration information includes handover target cells configured for the UE and a first handover condition and a second handover condition configured for each handover target cell, and handover difficulty of the first handover condition is lower than handover difficulty of the second handover condition.

A base station may configure the handover target cells for the UE and the first handover condition and the second handover condition configured for each handover target cell according to channel quality.

In step S202, the handover configuration information is sent to the UE.

According to the above-mentioned example, the handover configuration information is generated for the UE, and the handover configuration information includes the handover target cells configured for the UE and the first handover condition and the second handover condition configured for each handover target cell, so that during the handover of UE based on multiple conditions, the impact of services is considered while ensuring signal quality, and service interruption is avoided.

Figure 3:
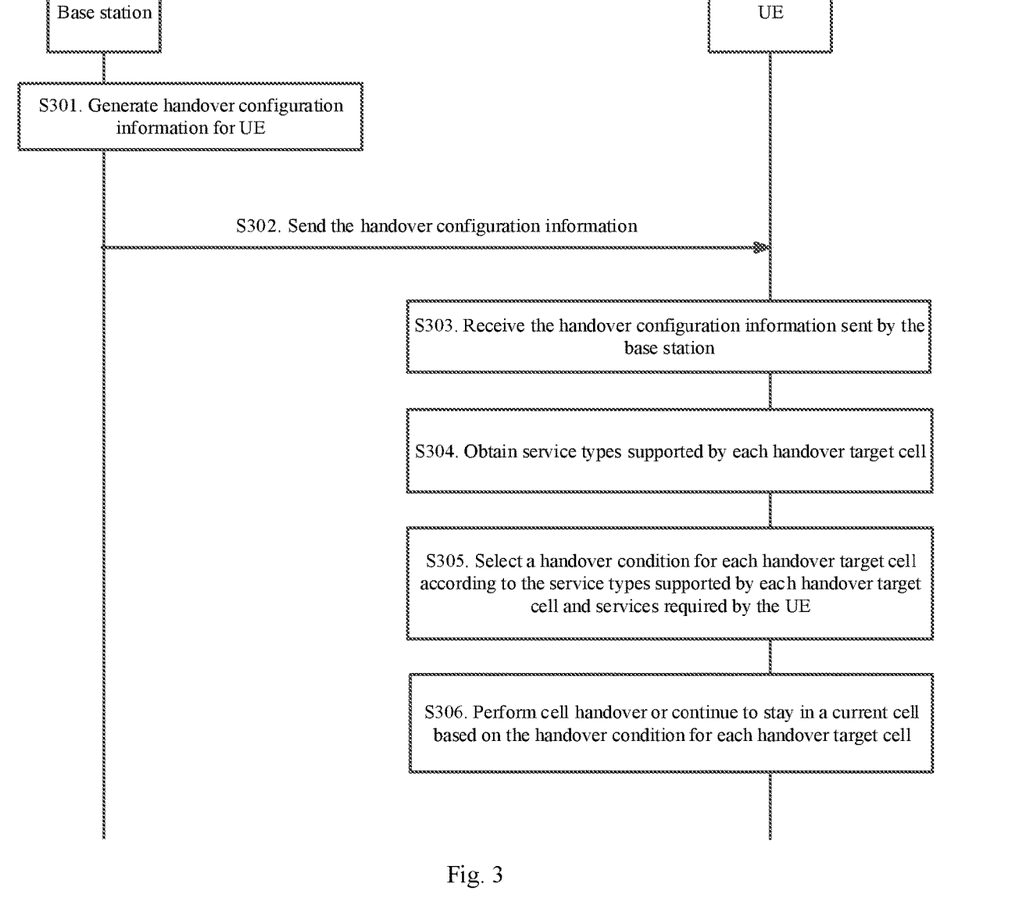
FIG. 3 is a signaling flow chart illustrating a cell handover method according to an example of the present application.

FIG. 3 is a signaling flow chart illustrating a cell handover method according to an example of the present application. The example is described from the perspective of an interaction between a base station and UE. As shown in FIG. 3, the method includes:

In step S301, the base station generates handover configuration information for the UE, the handover configuration information includes handover target cells configured for the UE and a first handover condition and a second handover condition configured for each handover target cell, and handover difficulty of the first handover condition is lower than handover difficulty of the second handover condition.

In step S302, the base station sends the handover configuration information to the UE.

In step S303, the UE receives the handover configuration information sent by the base station.

In step S304, the UE obtains service types supported by each handover target cell.

In step S305, the UE selects a handover condition for each handover target cell according to the service types supported by each handover target cell and services required by the UE.

In step S306, the UE performs cell handover or continues to stay in a current cell based on the handover condition for each handover target cell.

According to the above-mentioned example, through the interaction between the base station and the UE, the UE may obtain the service types supported by each handover target cell, and select the handover condition for each handover target cell according to the service types supported by each handover target cell and the services required by the UE, so that during the handover based on multiple conditions, the impact of services is considered while ensuring signal quality, and service interruption is avoided.

Figure 4:
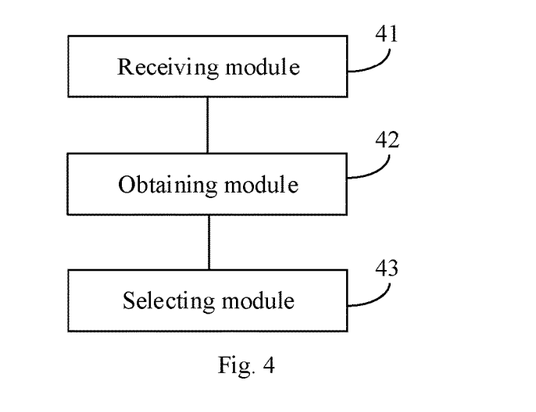
FIG. 4 is a block diagram illustrating a cell handover apparatus according to an example.

FIG. 4 is a block diagram illustrating a cell handover apparatus according to an example. The cell handover apparatus is configured in UE. As shown in FIG. 4, the apparatus includes:

A receiving module 41, configured to receive handover configuration information sent by a base station, the handover configuration information including handover target cells configured for the UE and a first handover condition and a second handover condition configured for each handover target cell, and handover difficulty of the first handover condition being lower than handover difficulty of the second handover condition.

For example, the first handover condition may be: reference signal receiving power (RSRP) of a serving cell is lower than −98 decibels (db), and RSRP of a handover target cell is higher than −98 db; and the second handover condition may be: the RSRP of the serving cell is lower than −101 db, and the RSRP of the handover target cell is higher than −98 db.

An obtaining module 42, configured to obtain service types supported by each handover target cell and contained in the handover configuration information received by the receiving module 41.

In the example, system information of each handover target cell may be read, and the service types supported by each handover target cell may be obtained according to the system information.

A selecting module 43, configured to select a handover condition for each handover target cell according to the service types supported by each handover target cell and obtained by the obtaining module 42 and services required by the UE.

According to the above-mentioned example, by obtaining the service types supported by each handover target cell and selecting the handover condition used for each handover target cell according to the service types supported by each handover target cell and the services required by the UE, during the handover based on multiple conditions, the impact of services is considered while ensuring signal quality, and service interruption is avoided.

Figure 5:
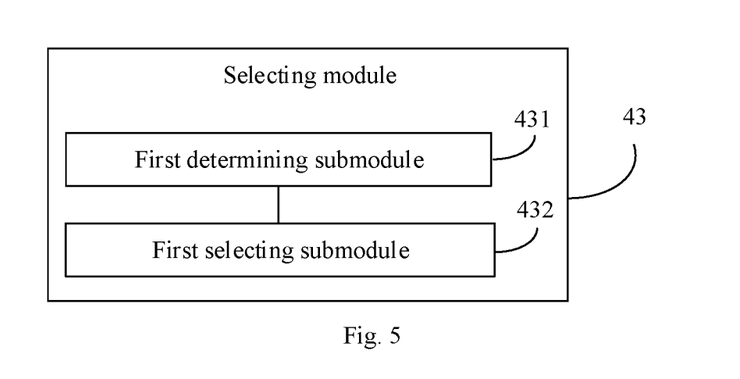
FIG. 5 is a block diagram illustrating another cell handover apparatus according to an example.

FIG. 5 is a block diagram illustrating another cell handover apparatus according to an example. As shown in FIG. 5, on the basis of the above-mentioned example shown in FIG. 4, the selecting module 43 may include: a first determining submodule 431 and a first selecting submodule 432.

The first determining submodule 431 is configured to determine a matching degree matching between the service types supported by each handover target cell and the services required by the UE.

The first selecting submodule 432 is configured to select the first handover condition for a handover target cell whose matching degree determined by the first determining submodule 431 is greater than a preset threshold, and select the second handover condition for a handover target cell whose matching degree is less than or equal to the threshold.

The matching degree may be determined according to the quantity of overlaps between the service types supported by each handover target cell and the services required by the UE.

Since the handover difficulty of the first handover condition is lower than the handover difficulty of the second handover condition, in order to make it easy for the UE to switch to the handover target cell with a high matching degree, the first handover condition is selected for the handover target cell with the high matching degree, and in order to make it difficult for the UE to switch to the handover target cell with a low matching degree (that is, try to keep it in current cell), the second handover condition is selected for the handover target cell with the low matching degree.

The above-mentioned preset threshold may be flexibly set as required.

According to the above-mentioned example, the matching degree between the service types supported by each handover target cell and the services required by the UE is determined, the first handover condition is selected for the handover target cell whose matching degree is greater than the preset threshold, and the second handover condition is selected for the handover target cell whose matching degree is less than or equal to the threshold, so that the selection of the handover conditions based on the matching of the service types is achieved.

Figure 6:
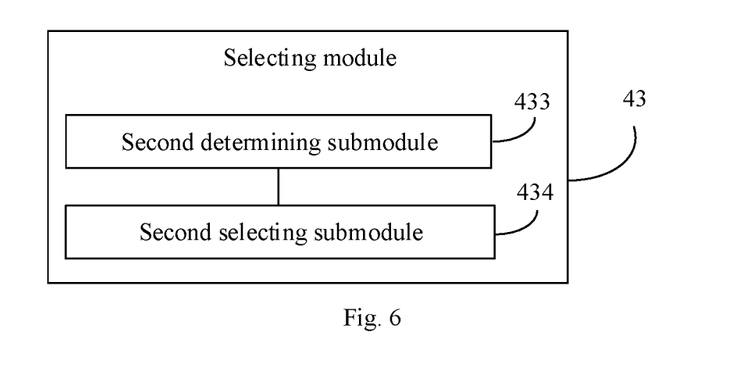
FIG. 6 is a block diagram illustrating yet another cell handover apparatus according to an example.

FIG. 6 is a block diagram illustrating yet another cell handover apparatus according to an example. As shown in FIG. 6, based on the example shown in FIG. 4, the selecting module 43 may include:

A second determining submodule 433, configured to determine a service with the highest priority from the services required by the UE.

A second selecting submodule 434, configured to select the first handover condition for a handover target cell that supports the service with the highest priority determined by the second determining submodule 433, and select the second handover condition for a handover target cell that does not support the service with the highest priority.

The service with the highest priority may be, but is not limited to, a service most needed by the UE.

Since the handover difficulty of the first handover condition is lower than the handover difficulty of the second handover condition, in order to make it easy for the UE to switch to the handover target cell that supports the service with the highest priority, the first handover condition is selected for the handover target cell that supports the service with the highest priority, and in order to make it difficult for the UE to switch to the handover target cell that does not support the service with the highest priority (that is, try to keep it in current cell), the second handover condition is selected for the handover target cell that does not support the service with the highest priority.

According to the above-mentioned example, the service with the highest priority is determined from the services required by the UE, and the first handover condition is selected for the handover target cell that supports the service with the highest priority, and the second handover condition is selected for the handover target cell that does not support the service with the highest priority, so that the selection of the handover conditions based on the services is achieved.

Figure 7:
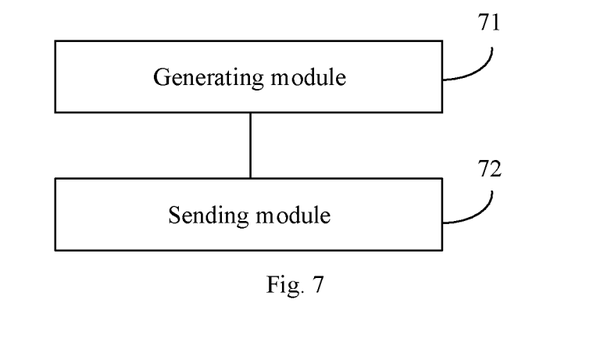
FIG. 7 is a block diagram illustrating a handover configuration apparatus according to an example.

FIG. 7 is a block diagram illustrating a handover configuration apparatus according to an example. The handover configuration apparatus is configured in a base station. As shown in FIG. 7, the apparatus includes:

A generating module 71, configured to generate handover configuration information for user equipment (UE), the handover configuration information including handover target cells configured for the UE and a first handover condition and a second handover condition configured for each handover target cell, and handover difficulty of the first handover condition being lower than handover difficulty of the second handover condition.

The base station may configure the handover target cells for the UE and the first handover condition and the second handover condition configured for each handover target cell according to channel quality.

A sending module 72, configured to send the handover configuration information generated by the generating module 71 to the UE.

According to the above-mentioned example, the handover configuration information is generated for the UE, and the handover configuration information includes the handover target cells configured for the UE and the first handover condition and the second handover condition configured for each handover target cell, so that during the handover of UE based on multiple conditions, the impact of services is considered while ensuring signal quality, and service interruption is avoided.

Figure 8:
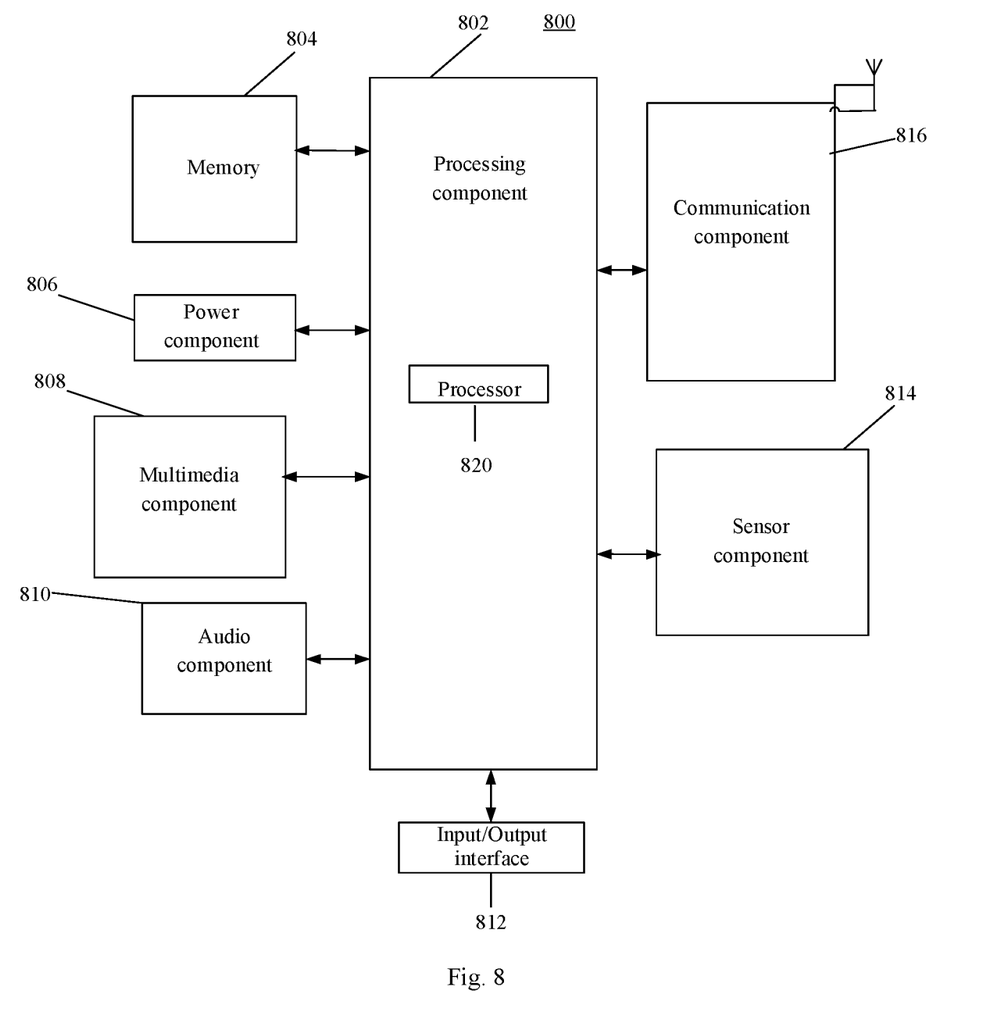
FIG. 8 is a block diagram suitable for a cell handover apparatus according to an example.

FIG. 8 is a block diagram suitable for a cell handover apparatus according to an example. For example, the apparatus 800 may be a mobile phone, a computer, a digital broadcast terminal, a messaging device, a gaming console, a tablet, a medical device, exercise equipment, a personal digital assistant, and other user equipment.

Referring to FIG. 8, the apparatus 800 may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the apparatus 800, such as operations associated with display, telephone calls, data communications, camera operations, and recording operations. The processing component 802 may include one or a plurality of processors 820 to execute instructions to complete all or part of the steps of the method described above. In addition, the processing component 802 may include one or a plurality of modules to facilitate the interaction between the processing component 802 and other components. For example, the processing component 802 may include a multimedia module to facilitate the interaction between the multimedia component 808 and the processing component 802.

One of the processors 820 in the processing component 802 may be configured to:
receive handover configuration information sent by a base station, the handover configuration information including handover target cells configured for UE and a first handover condition and a second handover condition configured for each handover target cell, and handover difficulty of the first handover condition being lower than handover difficulty of the second handover condition;
obtain service types supported by each handover target cell; and
select a handover condition for each handover target cell according to the service types supported by each handover target cell and services required by the UE.

The memory 804 is configured to store various types of data to support operations at the apparatus 800. Examples of such data include instructions for any applications or methods operated on the apparatus 800, contact data, phonebook data, messages, pictures, video, etc. The memory 804 may be implemented by any type of volatile or non-volatile memory devices or combinations of them, such as a Static Random Access Memory (SRAM), an Electrically Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic disk or a compact disk.

The power component 806 provides power for various components of the apparatus 800. The power component 806 may include a power management system, one or more power sources, and any other components associated with the generation, management and distribution of power for the apparatus 800.

The multimedia component 808 includes a screen providing an output interface between the apparatus 800 and a user. In some examples, the screen may include a liquid crystal display (LCD) and a touch panel (TP). If the screen includes the TP, the screen may be implemented as a touch screen to receive an input signal from a user. The touch panel includes one or more touch sensors to sense touch, swipe, and gestures on the touch panel. The touch sensors may not only sense a boundary of a touch or swipe action, but also detect duration and pressure related to the touch or swipe operation. In some examples, the multimedia component 808 includes a front camera and/or a rear camera. The front camera and/or the rear camera may receive external multimedia data when the apparatus 800 is in an operation mode, such as a photographing mode or a video mode. Each front camera and each rear camera may be fixed optical lens systems or may have focal lengths and optical zoom capabilities.

The audio component 810 is configured to output and/or input audio signals. For example, the audio component 810 includes a Microphone (MIC) configured to receive an external audio signal when the apparatus 800 is in an operation mode, such as a call mode, a recording mode, and a voice recognition mode. The received audio signals may be further stored in the memory 804 or sent via the communication component 816. In some examples, the audio component 810 further includes a speaker configured to output audio signals.

The I/O interface 812 provides an interface between the processing component 802 and peripheral interface modules, such as a keyboard, a click wheel, or buttons. These buttons may include, but not limited to: a home button, a volume button, a start button, and a lock button.

The sensor component 814 includes one or more sensors configured to provide status assessments of various aspects of the apparatus 800. For example, the sensor component 814 may detect an opened/closed state of the apparatus 800 and the relative positioning of the components such as a display and a keypad of the apparatus 800, and the sensor component 814 may also detect the position change of the apparatus 800 or a component of the apparatus 800, the presence or absence of contact between a user and the apparatus 800, the orientation or acceleration/deceleration of the apparatus 800, and the temperature change of the apparatus 800. The sensor component 814 may include a proximity sensor configured to detect the existence of nearby objects under the situation of no physical contact. The sensor component 814 may also include an optical sensor, such as a CMOS or CCD image sensor, for use in an imaging application. In some examples, the sensor component 814 may further include an accelerometer sensor, a gyroscope sensor, a magnetic sensor, a pressure sensor, or a temperature sensor.

The communication component 816 is configured to facilitate wired or wireless communication between the apparatus 800 and other devices. The apparatus 800 may access a wireless network based on a communication standard, such as WiFi, 2G or 3G, or combinations thereof. In one example, the communication component 816 receives broadcast signals or broadcast related information from an external broadcast management system via a broadcast channel. In one example, the communication component 816 further includes a Near Field Communication (NFC) module to facilitate short-range communication. For example, the NFC module may be implemented based on a Radio Frequency Identification (RFID) technology, an Infrared Data Association (IrDA) technology, an Ultra-Wideband (UWB) technology, a Bluetooth (BT) technology and other technologies.

In some examples, the apparatus 800 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic elements, for executing the above-described method.

In some examples, a non-transitory computer-readable storage medium including instructions is further provided, such as a memory 804 including the instructions, executable by a processor 820 in an apparatus 800, for executing the above-described method. For example, the non-transitory computer-readable storage medium may be a Read Only Memory (ROM), a Random Access Memory (RAM), a Compact Disc Read Only Memory (CD-ROM), a magnetic tape, a floppy disk, an optical data storage device, and the like.

Figure 9:
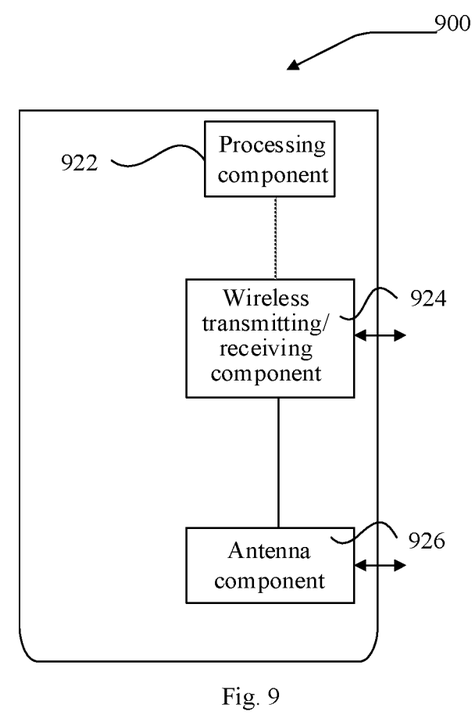
FIG. 9 is a block diagram suitable for a handover configuration apparatus according to an example.

FIG. 9 is a block diagram suitable for a handover configuration apparatus according to an example. An apparatus 900 may be provided as a base station. Referring to FIG. 9, the apparatus 900 includes a processing component 922, a wireless transmitting/receiving component 924, an antenna component 926, and a signal processing part specific to a wireless interface. The processing component 922 may further include one or more processors.

One of the processors in the processing component 922 may be configured to:
 generate handover configuration information for user equipment (UE), the handover configuration information including handover target cells configured for the UE and a first handover condition and a second handover condition configured for each handover target cell, and handover difficulty of the first handover condition being lower than handover difficulty of the second handover condition; and
 send the handover configuration information to the UE.

In some examples, a non-transitory computer-readable storage medium including instructions is further provided. The instructions may be executable by a processing component 922 of an apparatus 900 for executing the above-described handover configuration method. For example, the non-transitory computer-readable storage medium may be a ROM, a Random Access Memory (RAM), a CD-ROM, a magnetic tape, a floppy disk, an optical data storage device, and the like.

For the apparatus examples, since they basically correspond to the method examples, the relevant part may refer to the part of the descriptions of the method examples. The apparatus examples described above are merely illustrative. The units described as separate components may or may not be physically separated, and components displayed as units may or may not be physical units, that is, they may be located in one place, or distributed to a plurality of network units. Some or all of the modules may be selected according to actual needs to achieve the objectives of the solutions of the disclosure. Those ordinarily skilled in the art can understand and implement without creative work.

It should be noted that in the disclosure, relational terms such as first and second are only used to distinguish one entity or operation from another entity or operation, and do not necessarily require or imply any such actual relationship or sequence between these entities or operations. The terms "include", "comprise", or any other variants of them are intended to cover non-exclusive inclusion, so that processes, methods, objects or devices that include a series of elements include not only those elements, but also other elements that are not explicitly listed, or also include elements inherent to such processes, methods, objects, or devices. If there are no more restrictions, the element defined by a sentence "including a . . . " does not exclude the existence of other identical elements in the processes, methods, objects, or devices that include the elements.

Other examples of the disclosure will be apparent to those skilled in the art from consideration of the specification and practice of the disclosure herein. The disclosure is intended to cover any variations, uses, or adaptations of the disclosure following the general principles of the disclosure and including such departures from the disclosure as come within known or customary practice in the art. It is intended that the specification and embodiments be considered as examples only, with a true scope and spirit of the disclosure being indicated by the following claims.

The technical solutions provided by the present disclosure may include the following beneficial effects:

By obtaining the service types supported by each handover target cell and selecting the handover condition for each handover target cell according to the service types supported by each handover target cell and the services required by the UE, during the handover based on multiple conditions, the impact of services is considered while ensuring signal quality, and service interruption is avoided.

The handover configuration information is generated for the UE, and the handover configuration information includes the handover target cells configured for the UE and the first handover condition and the second handover condition configured for each handover target cell, so that during the handover of UE based on multiple conditions, the impact of services is considered while ensuring signal quality, and service interruption is avoided.

It will be appreciated that the disclosure is not limited to the exact construction that has been described above and illustrated in the accompanying drawings, and that various modifications and changes may be made without departing from the scope of the disclosure. It is intended that the scope of the disclosure only be limited by the appended claims.

What is claimed is:

1. A cell handover method, applied to user equipment (UE), and comprising:
 receiving handover configuration information sent by a base station, the handover configuration information comprising handover target cells configured for the UE, and a first handover condition and a second handover condition, both of which being configured for each handover target cell, wherein handover difficulty of the first handover condition is lower than handover difficulty of the second handover condition;
 obtaining service types supported by each handover target cell; and
 selecting a handover condition for each handover target cell according to the service types supported by each handover target cell and services required by the UE.

2. The method according to claim 1, wherein selecting the handover condition for each handover target cell according to the service types supported by each handover target cell and the services required by the UE comprises:
 determining a matching degree between the service types supported by each handover target cell and the services required by the UE; and
 selecting the first handover condition for a handover target cell whose matching degree is greater than a preset threshold, and selecting the second handover condition for a handover target cell whose matching degree is less than or equal to the threshold.

3. The method according to claim 2, wherein determining the matching degree between the service types supported by each handover target cell and the services required by the UE comprises:
 determining the matching degree according to the quantity of overlaps between the service types supported by each handover target cell and the services required by the UE.

4. The method according to claim 1, wherein selecting the handover condition for each handover target cell according to the service types supported by each handover target cell and the services required by the UE comprises:
  determining a service with the highest priority from the services required by the UE; and
  selecting the first handover condition for a handover target cell that supports the service with the highest priority, and selecting the second handover condition for a handover target cell that does not support the service with the highest priority.

5. The method according to claim 1, wherein obtaining the service types supported by each handover target cell comprises:
  reading system information of each handover target cell, and obtaining the service types supported by each handover target cell according to the system information.

6. A handover configuration method, applied to a base station, and comprising:
  generating handover configuration information for user equipment (UE), the handover configuration information comprising handover target cells configured for the UE, and a first handover condition and a second handover condition, both of which being configured for each handover target cell, wherein handover difficulty of the first handover condition is lower than handover difficulty of the second handover condition; and
  sending the handover configuration information to the UE.

7. A user equipment, comprising:
  at least one processor; and
  a memory configured to store executable instructions of the at least one processor; wherein
  the at least one processor is configured to:
  receive handover configuration information sent by a base station, the handover configuration information comprising handover target cells configured for the UE, and a first handover condition and a second handover condition, both of which being configured for each handover target cell, wherein handover difficulty of the first handover condition is lower than handover difficulty of the second handover condition;
  obtain service types supported by each handover target cell; and
  select a handover condition for each handover target cell according to the service types supported by each handover target cell and services required by the UE.

8. The user equipment according to claim 7, wherein the at least one processor is configured to select the handover condition for each handover target cell by:
  determining a matching degree between the service types supported by each handover target cell and the services required by the UE; and
  selecting the first handover condition for a handover target cell whose matching degree is greater than a preset threshold, and selecting the second handover condition for a handover target cell whose matching degree is less than or equal to the threshold.

9. The user equipment according to claim 8, wherein the at least one processor is configured to determine the matching degree by:
  determining the matching degree according to the quantity of overlaps between the service types supported by each handover target cell and the services required by the UE.

10. The user equipment according to claim 7, wherein the at least one processor is configured to select the handover condition for each handover target cell by:
  determining a service with the highest priority from the services required by the UE; and
  selecting the first handover condition for a handover target cell that supports the service with the highest priority, and selecting the second handover condition for a handover target cell that does not support the service with the highest priority.

11. The user equipment according to claim 7, wherein the at least one processor is configured to obtain the service types supported by each handover target cell by:
  reading system information of each handover target cell, and obtaining the service types supported by each handover target cell according to the system information.

12. A base station, comprising:
  at least one processor; and
  a memory configured to store executable instructions of the at least one processor; wherein
  the at least one processor is configured to implement the handover configuration method according to claim 6.

13. A non-transitory computer-readable storage medium, having computer instructions stored thereon, wherein when the instructions are executed by at least one processor, steps of the cell handover method according to claim 1 are implemented.

14. A non-transitory computer-readable storage medium, having computer instructions stored thereon, wherein when the instructions are executed by at least one processor, steps of the handover configuration method according to claim 6 are implemented.

* * * * *